(No Model.)
J. A. SMITHHISLER.
BRAKE SHOE.
No. 390,914. Patented Oct. 9, 1888.
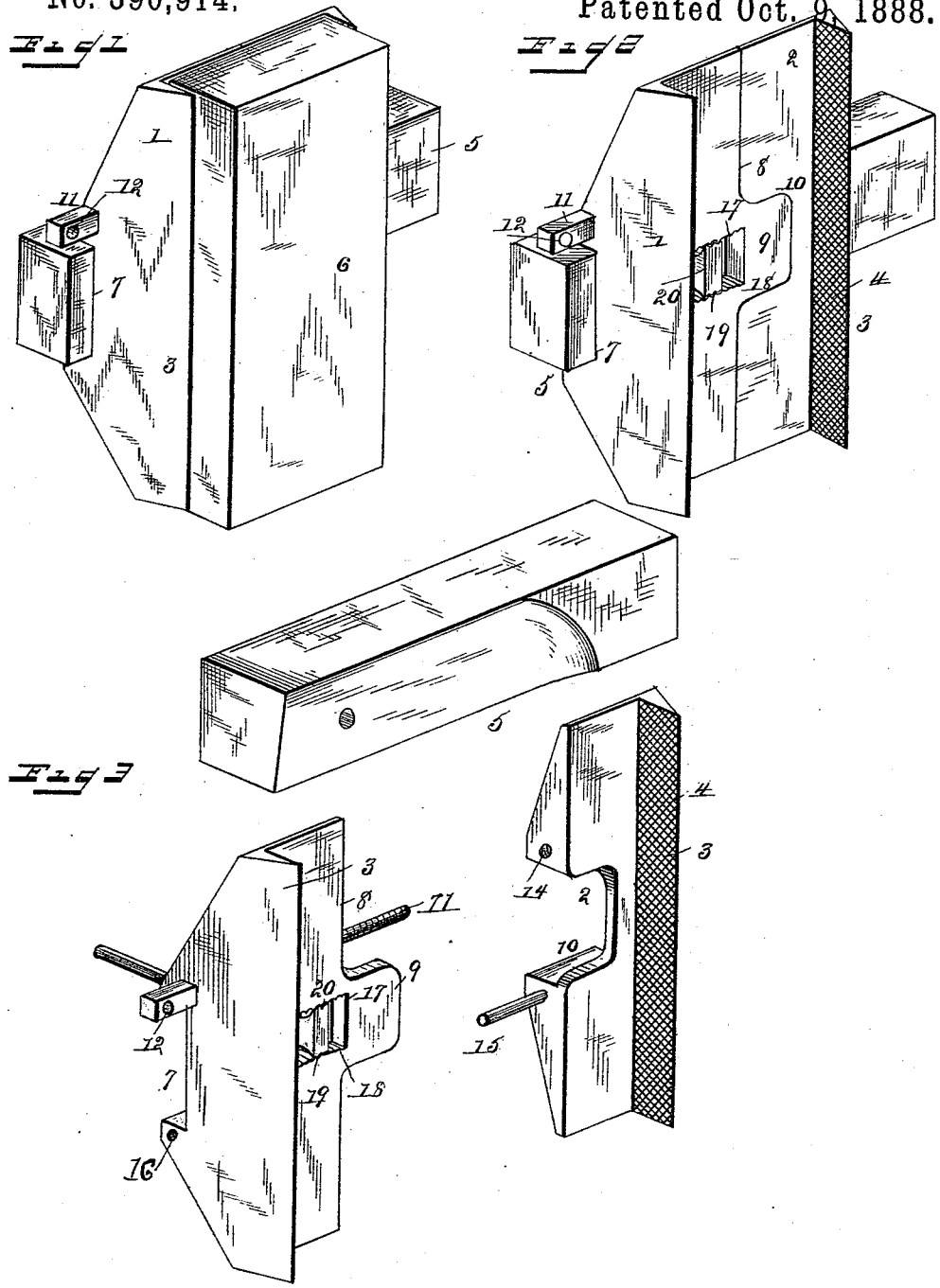

UNITED STATES PATENT OFFICE.

JOHN A. SMITHHISLER, OF DANVILLE, KANSAS.

BRAKE-SHOE.

SPECIFICATION forming part of Letters Patent No. 390,914, dated October 9, 1888.

Application filed May 7, 1888. Serial No. 273,078. (No model.)

*To all whom it may concern:*

Be it known that I, JOHN A. SMITHHISLER, a citizen of the United States, and a resident of Danville, in the county of Harper and State of Kansas, have invented certain new and useful Improvements in Brake Shoes; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of one end of a brake-bar provided with my improved brake-shoe. Fig. 2 is a similar view showing the block removed from the shoe; and Fig. 3 is a perspective view of the separated parts of the device, showing the parts placed approximate to their normal positions.

The same numerals of reference indicate the same or corresponding parts in all the figures.

My invention has relation to that class of brake-shoes for vehicles in which a wearing-block may be clamped in the shoe; and it consists in the improved construction and combination of parts of such a brake shoe, as hereinafter more fully described and claimed.

In the accompanying drawings, the numerals 1 and 2 indicate the two parts of the brake-shoe, which parts are each formed with a flange, 3, at the outer side, having its inner face, 4, serrated or roughened, for the purpose of firmly biting into and holding the block 6, which is clamped between the flanges. The sides of the parts facing the brake-bar 5 are formed with a transverse recess, 7, into which the side of the said bar may fit, and the meeting edge 8 of one of the parts, 1, is formed with a laterally-projecting lip, 9, which may fit into the correspondingly notched or recessed side, 10, of the other part, 2, the lip and the notch or recess serving to prevent longitudinal play of the parts. The parts are held drawn together by means of a transverse screw-threaded bolt, 11, provided with a transversely-perforated head, 12, for turning it and passing through a smooth perforation, 13, in the part 1, and through a female screw-threaded perforation, 14, in the part 2. These said perforations pass transversely through the parts above the transverse recess in the outwardly-facing side of the shoe, and the part 2 is provided with a laterally-projecting stud, 15, upon its inner edge below the recess or notch for the lip, which stud will fit into a corresponding perforation or recess, 16, in the edge of the part 1, the bolt, stud, and lip all serving to secure the parts together, and to likewise prevent any longitudinal play of the parts upon one another.

The part 1 is provided with a transverse slot, 17, in its back portion, the said slot extending partly into the lip, and the edges of this slot are beveled from the inner face and formed with serrations, as shown at 18, so as to form holding-surfaces for the similarly-serrated beveled faces of the head 19 of a bolt, 20, which projects out through the slot and is secured in the brake bar passing through it and having a suitable nut or similar fastening at its end. It will now be seen that the wearing-block may be clamped between the lips or flanges of the parts, which have been moved apart for the insertion of the block, the transverse screw-threaded bolt serving to draw the parts together, and whenever the block should become loosened the parts may be drawn tighter by the bolt.

By having the transverse slot with the serrated edges the bolt in the brake-bar may be located farther in or out in the back of the shoe, so that the shoe may be adjusted to register with the rim of the wheel if the dish of the wheel should be changed.

Having thus described my invention, I claim and desire to secure by Letters Patent of the United States—

1. The combination of a brake-shoe having a transverse slot in its back formed with serrated and beveled edges, the brake-bar, and a bolt having serrated and beveled faces upon its head corresponding to the serrated and beveled edges of the slot and passing out through the slot and being secured in the brake-bar, as shown, and for the purpose specified.

2. The combination of two parts of a brake-shoe having roughened flanges at the outer edges and having a stud and corresponding bore or recess in their respective meeting inner edges, and having registering transverse perforations, respectively smooth and screw-threaded, a wearing-block clamped between the flanges of the parts, and a bolt passed through the transverse perforations and having its end screw-threaded and fitted in the threaded perforation, drawing the parts of the shoe together, as shown, and for the purpose specified.

3. The combination of brake shoe part 1, having the flange roughened upon its inner side, and having the lip upon the inner edge and formed with the transverse slot having inwardly beveled and serrated edges, and with the transverse smooth perforation and the transverse bore or recess, and with the transverse groove or recess in the back, the part 2, having the roughened flange and the notched or recessed inner edge and formed with the screw-threaded transverse perforation and with the stud upon the inner edge, and with the transverse groove or recess in the back, the wearing-block, the threaded bolt, the brake-bar, and the bolt for the latter bar having the head formed with beveled and serrated sides or faces, as shown, and for the purpose specified.

In testimony that I claim the foregoing as my own I have hereunto affixed my signature in presence of two witnesses.

JOHN A. SMITHHISLER.

Witnesses:
CHARLIE B. HACKETT,
J. E. BUNCE.